ized structure or condition in the plaster, so that access of air is had to the leaves with the advantages already described.

UNITED STATES PATENT OFFICE.

HENRY M. POLLARD, OF PROVIDENCE, RHODE ISLAND.

INSECTICIDE.

SPECIFICATION forming part of Letters Patent No. 379,326, dated March 13, 1888.

Application filed February 3, 1887. Serial No. 226,427. (No specimens.)

*To all whom it may concern:*

Be it known that I, HENRY M. POLLARD, of Providence, in the county of Providence and State of Rhode Island, have invented a certain new and useful Improved Insecticide; and I do hereby declare that the following is a full, clear, and exact description thereof.

The object of this invention is to provide a poisonous material or substance for destroying insects injurious to vegetation, which will have no harmful effect upon the plants to which it is applied, and will have the property of adhering to the leaves or foliage of the plants, so that it will not be easily washed therefrom by rain. For this purpose I employ a compound consisting as its essential ingredients of sulphate of lime or gypsum in its calcined state, sulphate of copper or other mineral poison, and umber, preferably employed in its calcined or burnt form. With these ingredients a certain quantity of yellow ocher may be employed for a purpose hereinafter explained. The poison that I prefer to use is sulphate of copper; but other mineral poisons may also be used.

I have obtained favorable results in practice by the use of an admixture of sulphate of lime, sulphate of copper, and burnt umber, in the following proportions — namely, one hundred pounds sulphate of lime, two and three-fourths pounds sulphate of copper, and six pounds of burnt umber. These ingredients are mixed in a powdered and dry state, and in this condition are sprinkled or thrown upon the plants which it is desired to protect from the attacks of insects.

The compound is preferably applied when the plants are moist from the dew or rain, and when thus applied, the calcined sulphate of lime being anhydrous takes up a certain quantity of water and becomes solidified upon and adheres to the leaves and foliage, and the retention of the poisonous mixture upon the plant is thus insured. It will of course be understood that water may be applied to the plants, preferably before the compound is sprinkled thereon, for the purpose of causing the adhesion of the compound in the manner above described.

The plaster or gypsum, after it is set by the absorption of water in the manner set forth, although to some extent soluble in water, is sufficiently insoluble to withstand the action of the weather for a considerable time, and will not be easily washed off the leaves by subsequent rains, and the compound thus applied affords protection to the plants for a long time, so that commonly only one application will be necessary during the usual period of growth of the common plants, such as potatoes and tobacco. One of the principal results obtained by the employment of burnt umber in the compound is that of giving porosity to the coating of plaster upon the leaves of the plants, so that the said coating will not exclude air, and thereby injuriously affect the plant, it being a well-understood fact that a coating or varnish upon leaves of a plant which cuts off all access of air thereto arrests the performance of their function as lungs of the plant, and thereby retards the growth of if it does not kill the plant. In addition to its function of making the plaster coating upon the leaves open or porous, in the manner described, the burnt umber is found to increase the poisonous effect of the compound by the combination of the iron therein contained with the sulphate of lime, as may be more fully understood from the following description of the chemical changes or combinations which take place when the ingredients named are mixed with each other. The umber is an inorganic compound, containing usually a considerable portion of iron oxide, usually about ten or twelve per cent., together with other mineral substances, such as silica and alumina. The calcining of the natural or native umber converts the oxide of iron therein contained into a peroxide, and also makes the umber anhydrous. When the calcined or burnt umber is brought into contact with the sulphate of lime in the compound, there is to a certain extent an exchange of bases—that is to say, the sulphuric acid of the sulphate of lime having a great affinity for the iron oxide, a portion of it combines with the latter to produce a sulphate of iron. The sulphate of iron being an active metallic poison, serves to make the compound more efficient as a destructive agent to injurious insects. It may be further stated that the burnt umber, being anhydrous, readily imbibes water, and thereby aids the drying or hardening of the gypsum, while at the same time, having no tendency in itself to solidify, it gives a porous character to the adhering coating upon the leaves, and makes said coating pervious to air and moisture.

It will of course be understood that the quantity of poison employed may be varied as may be found necessary to produce the desired effect. The quantity above indicated has been found to be sufficiently destructive to insects, such as potato-bugs, which infest common garden-plants.

The compound, consisting of sulphate of lime, a metallic poison, and burnt umber, is effective for the purpose for which it is intended without other ingredients. I have found, however, that the addition of a quantity of yellow ocher to the compound has the effect of rendering it less soluble in water, and thereby lessens the liability of the absorption of any of the poison by the plant to which it is applied. When yellow ocher is used in the compound, I prefer to employ it in the proportion of two pounds of yellow ocher to one hundred pounds of sulphate of lime, two and three-fourths pounds sulphate of copper, and six pounds of burnt umber.

In view of the fact that the yellow ocher is not essential to the effective operation of the compound, the said compound is herein broadly claimed without restriction to the use of yellow ocher; but by reason of the favorable result obtained by the addition of yellow ocher, a claim is also made to a compound in which the last-named substance is included as an ingredient.

The employment of burnt umber as a means of giving porosity to the solidified compound is preferred for reasons above stated; but I do not desire to restrict my invention to the use of this particular material, but desire to claim the compound described, either when containing burnt umber or when the latter is replaced by any other anhydrous earthy substance giving the desired porous character to the plaster.

The compound herein claimed, inasmuch as it affords a porous coating to the leaves, tends to retain moisture in contact with the foliage, and thereby aids the nourishment and facilitates the rapid development of the plants.

I am aware that it has been proposed heretofore to employ as an insect-destroying compound paris-green mixed with flour, plaster, gum, licorice-root, or cotton-seed meal for the purpose of causing the poison to adhere to the leaves of the plants to which it is applied. I am not aware, however, that a compound containing sulphate of lime, sulphate of copper, or other mineral poison, and burnt umber or an equivalent earthy substance, has ever heretofore been employed, and a compound claim containing such ingredients, either with or without other substances, is herein claimed as new.

I claim as my invention—

A compound for the purpose described, consisting of sulphate of lime, sulphate of copper, and burnt umber, giving porosity to the coating formed by the compound.

In testimony that I claim the foregoing as my invention I affix my signature in presence of two witnesses.

HENRY M. POLLARD.

Witnesses:
C. CLARENCE POOLE,
CHARLES T. LORING.